(12) United States Patent
Hervieu

(10) Patent No.: US 10,274,656 B2
(45) Date of Patent: Apr. 30, 2019

(54) OPTICAL DEVICE WITH A FUNCTIONALISED COATING AND METHOD FOR SUCH OPTICAL DEVICE

(71) Applicant: Essilor International (Compagnie Generale d'Optique), Charenton le Pont (FR)

(72) Inventor: Gregory Hervieu, Bangkok (TH)

(73) Assignee: ESSILOR INTERNATIONAL, Charenton-le-Pont (FR)

(*) Notice: Subject to any disclaimer, the term of this patent is extended or adjusted under 35 U.S.C. 154(b) by 113 days.

(21) Appl. No.: 15/066,610

(22) Filed: Mar. 10, 2016

(65) Prior Publication Data
US 2016/0266290 A1    Sep. 15, 2016

(30) Foreign Application Priority Data
Mar. 11, 2015    (EP) .................... 15305364

(51) Int. Cl.
| G02B 5/28 | (2006.01) |
| G02C 7/10 | (2006.01) |
| G02B 1/10 | (2015.01) |
| G02B 1/111 | (2015.01) |
| B29D 11/00 | (2006.01) |

(52) U.S. Cl.
CPC ........ G02B 5/285 (2013.01); B29D 11/00865 (2013.01); G02B 1/10 (2013.01); G02B 1/111 (2013.01); G02C 7/107 (2013.01); B29D 11/00009 (2013.01)

(58) Field of Classification Search
CPC .......... G02B 5/285; G02B 1/10; G02B 1/111; G02C 7/107; B29D 11/00865; B29D 11/00009

USPC ......................................................... 351/159
See application file for complete search history.

(56) References Cited

U.S. PATENT DOCUMENTS

| 3,724,934 | A * | 4/1973 | Bloom ................ C08K 5/0091 252/587 |
| 4,211,823 | A | 7/1980 | Suzuki et al. ................ 428/412 |
| 4,776,868 | A | 10/1988 | Trotter, Jr. et al. ............ 65/18.2 |
| 5,015,523 | A | 5/1991 | Kawashima et al. ......... 428/336 |
| 5,316,791 | A | 5/1994 | Farber et al. ................. 427/164 |
| 6,632,375 | B2 | 10/2003 | Rabarot et al. ................. 216/26 |
| 2005/0079284 | A1 | 4/2005 | Ivkovich, Jr. et al. ....... 427/162 |
| 2005/0123771 | A1 | 6/2005 | Vaneeckhoutte et al. .... 428/426 |
| 2007/0286994 | A1 | 12/2007 | Walker et al. ................ 428/212 |
| 2008/0206470 | A1 | 8/2008 | Thomas et al. ............... 427/402 |
| 2012/0174823 | A1* | 7/2012 | Ham ..................... C09D 5/1675 106/287.14 |

(Continued)

FOREIGN PATENT DOCUMENTS

| EP | 0614957 | 9/1994 |
| EP | 10808928 | 11/2012 |

*Primary Examiner* — Collin X Beatty
*Assistant Examiner* — Grant A Gagnon
(74) *Attorney, Agent, or Firm* — Norton Rose Fulbright US LLP

(57) ABSTRACT

The invention pertains to an optical device comprising a substrate with two main faces, and, on at least one face, a first coating which is in contact with a second coating, the first coating being positioned between the second coating and the substrate, the first coating is a release layer, adapted so that it can be selectively activated in order to diminish mechanical properties or adhesion enabling the second coating to be fastened to the substrate.

18 Claims, 4 Drawing Sheets

(56) References Cited

U.S. PATENT DOCUMENTS

2013/0316071 A1* 11/2013 Arrouy .................... G02C 7/10
427/8

* cited by examiner

OPTICAL DEVICE WITH A FUNCTIONALISED COATING AND METHOD FOR SUCH OPTICAL DEVICE

FIELD OF THE INVENTION

The present invention relates to the field of optical devices comprising a substrate at least coated with a coating. In particular, this invention relates to a method for providing a substrate with a temporary coating or a coating that can be removed.

BACKGROUND OF THE INVENTION

One of way sellers can promote a product to a customer is to demonstrate the product or the effects of the product to the consumer.

For this, the seller has multiple tools available to him. Of those, one is to describe the product or its effect to the consumer, either by oral or written form, possibly helped by pictures or advertisement support, such as for medical drugs, for example or technical notes in a sport shop. Another tool is to illustrate the advantages of the product, either using a video, or by using a demonstrator. Demonstrators generally use a specific product, or part of the product, and propose to use it in a mock situation that enables to show the advantage of the product. Finally, another tool available to the seller is to enable the customer to try or sample the product before buying it. It is often the case for books, clothes, shoes, perfumes, or even televisions or computer screens that are displayed to the customer.

In the ophthalmic industry, the sellers, and especially eye-care-professionals, ECP hereafters, which want to sell a product for prescription glasses, which have given prescription, do not have access to all those tools. In that cases, products refers to the material of the lenses, a particular optical design versus another one or even the different added values: the possibility of coloration, of having photochromic or polarized treatments, of having anti-fog or anti-smudge coatings, of having anti-scratches, anti-shock, or antistatic treatments, of having anti-reflective treatments, anti-UV antireflective treatments, blue-protection anti-reflective treatments.

Prescription glasses have a prescription that is specific to the customer that order lenses. In general, the customer chooses frames, and the different products or options he desires for his/her lenses and then the ECP order lenses which have an optical function corresponding to the wearer and his/her prescription and which further have all the ordered options.

Accordingly, if the seller wanted to let the customer try a specific product in real-life conditions, with the personalized prescription, the seller would need either to have in stock all possible prescriptions with all possible combinations of options or allow the customer to buy the ordered glasses "on trial," with the expensive risk of the customer returning glasses, and thus lenses, that are custom-made and thus that cannot be sold to another customer.

Thus when an ECP wants to sell an option on a lens, he only has available descriptions, videos and demonstrators. Demonstrators, in this case, encompasses equipments designed to make highlight the behavior of an option on a lens that is not the final lens, and is often a plano-lens, i.e., a lens with an optical function of zero dioptry (0.00 D).

There is thus an interest to provide a simple solution for trial optical added values.

SUMMARY OF THE INVENTION

The present invention relates to a removable product for an optical device that is easy to manufacture and easy to remove.

The Invention also relates to an optical device equipped with said product, and a process for making such optical device.

In particular, the invention relates to an optical device comprising a substrate, the substrate comprising two main faces, and, on at least one face, at least a first coating is in contact with a second coating, the first coating being positioned between the second coating and the substrate and the first coating is a release layer, adapted so that it can be selectively activated in order to diminishes mechanical properties or adhesion enabling the second coating to be joint to the substrate.

It is understood that the second coating is a functional coating or film in the meaning of ophthlamics, which brings at least one function to the optical article and is meant to be present on the optical article during use by a wearer, at least for a certain duration. Preferentially it is chosen from the list consisting of: a coloration or tinted coating or film, a photochromic or polarized treatments, anti-fog or anti-smudge coatings, anti-scratches, anti-shock, or antistatic treatments, anti-reflective treatments, wavelength specific treatments, optical power such as an addition or a specific optical design or a mix thereof. Wavelength specific treatment means treatments aiming to cut one or more specific wavelength ranges such as UV or blue-protection treatments, computer-designed blue protection treatments and can be obtained through specific antireflective treatments or dyeing treatments cutting a specific wavelength.

The release layer is to be chosen so as to be compliant with the optical property of the optical device in a way that it does not modify any optical property that would disturb the vision of the glasses wearer. The optical properties of the substrate such as the substrate transparency, optical function (lens power), level of optical distortion should not be modified by the release layer.

Using the innovation, before activation, the second coating is firmly attached to the substrate and can thus be manipulated with the substrate. In particular, the optical device with the second coating may be processed in order to manufacture glasses. At the same time the second coating can be removed easily by activation of the first coating. Thus the second coating can be a temporary coating. Thus, the problem presented above is solved in an easy to produce manner.

In particular, the second coating may be an optical product that an ECP desires to present to trial to a customer.

In variants of the invention:
  The activation may be gradual, or may need a specific activation step.
  The release layer may be a material that degrades itself whereupon it is activated; in particular the material of the release layer may have a degradation activated by a chemical, by irradiation such as UV light or temperature under 80° C. For example the release layer is a glue or resin, such as a glue that is dissolved using a solvent.
  The release layer may be in a material that is adapted to absorb external compounds, either in the release layer or at the interface between the release layer with one or both of the substrate or the second coating, thereby forcing a release of the second coating. The release layer can thus be an hydrophilic material, which is thus adapted to incorporate aqueous liquids at the interface between the release layer with one or both of the substrate or the second coating. For example it can be a layer made of a 2-[methoxy(polyéthyleneoxy)propyl] trimethoxysilane of formula CH3O—(CH2CH2O)y(CH2)3Si(OCH3)3 with y comprised between 6 and 9 included.

The second coating can be an interferential optical filter coating, preferentially comprising at least a nanometer-scale SiO2 layer or a nanometer scale ZrO2 layer, or preferentially an antireflective coating.

The optical device is an ophthalmic element, and in a more particular case is an ophthalmic lens.

The optical device comprises at least one underlayer present in-between the release layer and the substrate.

The optical article comprises one or both of an hard coat and an primer coating as underlayers.

The invention relates also to a process for releasing a coating, called second coating, present on an optical device, comprising the following successive steps:
 a. Providing an optical device as described above
 b. Activating the release layer
 c. Optionally cleaning the optical device.

In particular, when the release layer is a layer of hydrophilic material, the activation step involves immersing the optical device into a water bath or wiping the optical device using water.

The invention relates also to a process for manufacturing an optical device such as the one described above. The process comprises thus the steps of providing a substrate with two main faces, providing a second coating onto at least one face of the substrate, and providing a release layer in-between the substrate and the second coating.

In particular the release layer can be a SiPeO layer deposited during a spraying step or a vacuum deposition step.

And in particular, the second coating can be an interferential optical filter coating, such as an antireflective stack, deposited during a vacuum deposition step.

For example, the SiPeO layer and the interferential optical filter coating may be deposited during a same vacuum deposition step which would comprise multiple sub steps: at least one per different layer of different material.

DESCRIPTION OF EMBODIMENTS

Definitions

Figure 1:
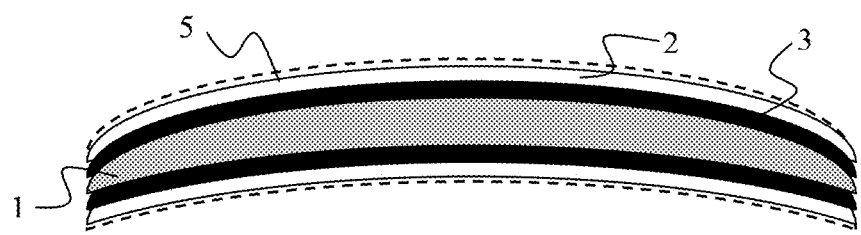
FIG. 1 describes a cross-section view of a general embodiment of the invention.

The present invention can be used in all kinds of optical devices and elements, such as ophthalmic elements and devices. Non-limiting examples of ophthalmic elements include corrective and non-corrective lenses, including single vision or multi-vision lenses, which may be either segmented or non-segmented, as well as other elements used to correct, protect, or enhance vision, magnifying lenses and protective lenses or visors such as found in spectacles, glasses, goggles and helmets. The optical device of the present invention is preferably a lens, and more preferably an ophthalmic lens.

By definition, in the present specification, when using the term hard coat it is meant as is indicated by its name, a layer that has the role of protecting the ophthalmic lens from scratches and abrasion.

Specific examples of mixtures used to prepare the hard coat, also called abrasion-resistant coating, may be found in US 2005/0123771.

The hard coat can be any layer conventionally used as abrasion-resistant coating in the field of ophthalmic lenses.

Hard abrasion-resistant and/or scratch-resistant coatings are preferably prepared from compositions comprising at least one alkoxysilane and/or one hydrolysat of the latter obtained, for example, by hydrolysis with a hydrochloric acid solution. After the hydrolysis stage, the duration of which is generally between 2 h and 24 h, preferably between 2 h and 6 h, catalysts can optionally be added. A surface-active compound is preferably also added in order to promote the optical quality of the deposit.

may be made, among the hard coatings recommended in the present invention, of coatings based on epoxysilane hydrolysat, such as those described in the patents EP 0614957, U.S. Pat. No. 4,211,823 and U.S. Pat. No. 5,015,523.

By definition, in the present specification, when using the term primer layer it is meant a coating that makes it possible to improve the impact strength of the other layers in the final product, thus providing anti-shock properties to the optical device. In addition it often enables to improve adhesion properties between the hard coat and the substrate. Often the primer compositions are based on polyurethane latex.

A method for applying the primer onto the substrate is given for instance in Example 1 of U.S. Pat. No. 5,316,791.

Anti-reflection (AR) coatings and their methods of making are well known in the art and examples are disclosed in US 20080206470. The AR coating of the present invention may include any layer or stack of layers which improves the anti-reflective properties of the finished optical device over at least one portion of the visible spectrum, thereby increasing the transmission of light and reducing surface reflectance at the article-air interface.

They are often composed of an alternance of high index layers and low index layers of thicknesses calculated so as to form an interferential coating, the low index layers being often based on silica.

Generally in ophthalmics, to deserve the appellation "antireflective coating," the antireflective coating must have reflection properties falling within the norm ISO8980-4, ie, approximately it must not have a visible reflection coefficient (Rv) of more than 2.5% for light incident on the surface at angle of 15° counted from the normal to the surface at the observed point.

A simple antireflective coating could be a $MgF_2$ layer of thickness calculated to act as a quarterwave-plate for light of a wavelength situated in the range 500 nm-600 nm, or a layer of zirconia overlayed by a layer of silica, with layers having a thickness calculated easily by the person skilled in the art to provide an interferential antireflective effect.

A pseudo-antireflective coating could be a silica layer of thickness calculated to act as a quarterwave-plate for light of a wavelength situated in the range 500 nm-600 nm.

In the present invention, an interferential filter is meant to define any interferential coating that enable to reduce the reflection of the surface of the optical device compared to same optical device without said coating. It thus encompasses at least antireflective coatings and pseudo-antireflective coatings that have a reflection coefficient of 5% or less. Further, if the interferential filter is the second coating of the invention, immediately in contact with the release layer, the reduction of reflection is to be observed as compared to an optical device without both the antireflective coating and the release layer.

In this description, the expression "comprised between" used in connection with a range of values should be understood as including the specific upper and lower values of this range.

Further, the figures in the present specification are schematics and scaling and proportions have no meaning save as to illustrate points of the invention.

In the figures, elements numbered with the same number are identical elements unless specifically mentioned.

The invention proposes to produce an optical device comprising at least a substrate, a release layer and a second coating. The release layer is a layer that can be activated in order to change the binding forces that enable the second coating to be attached to the substrate.

At least two main options have been identified by the inventors.

A first option is based on a controlled deterioration of the release layer deteriorates upon activation, hereby enabling the second coating to be released from the substrate. Multiple variants are possible, such as the release layer being a glue that loses stickiness upon activation, or that the activation forms a adhesion-reducer material on one interface with the release layer, or that the release layer degrades and breaks apart.

A second option is based on imposing a physical change in dimensions on the release layer upon activation, hereby introducing stress in the second coating and/or in the release layer and breaking either the second coating or both the release layer and the second coating. Such variation of dimension may be induced for example by absorbing an activator, such as a liquid, within the release layer or at one of its interfaces. Another variant is to have the release layer be a reactive material that reacts when presented with a reactant. Such reaction, such as an oxidation or nitruration modifies the volume of the layer, imposing stress on the second coating.

The activation may be gradual, or may need a specific activation step.

Thus, in a general manner for presenting the invention is illustrated in FIG. 1, the optical device comprise a substrate 1, on which is present a second coating 2. In-between the substrate 1 and the coating 2 is present a release layer 3. In FIG. 1, the second coating 2 and the release layer 3 are on both faces, but alternatively they may be present only on one face.

The release layer 3 is in contact with the second coating 2.

In a first embodiment, the second coating 2 is an antireflective stack. It may comprise one or more layers arranged so that it provides anti-reflective properties to the optical device, as defined in the ophthalmic domain.

Alternatively, or in combination with the above embodiment, the second coating 2 may comprise an antistatic layer, which brings antistatic properties to the optical device.

In some cases, there may be a top-coat 5 on the second coating 2. The top coat 5 may be an antifouling or anti-smudge topcoat or an anti-fog topcoat.

In a variant, there may be one or more underlayers in-between the substrate 1 and the release layer 3.

Figure 2:
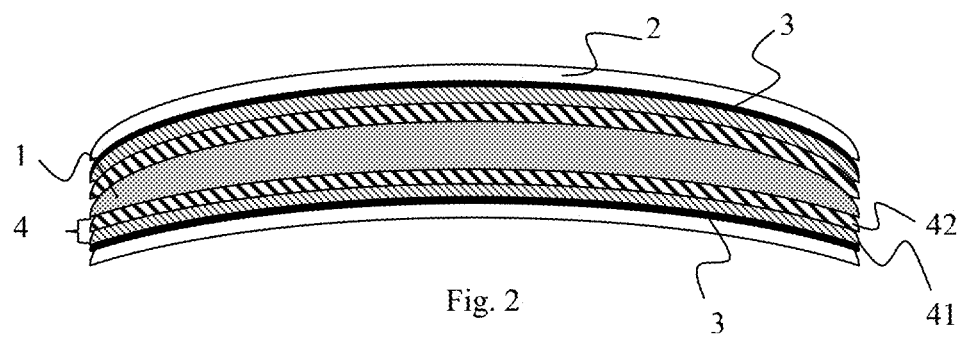
FIG. 2 describes a cross-section view of a first embodiment of the invention.

For example, as illustrated in FIG. 2, the first embodiment comprises two underlayers 4. A first underlayer 41, in contact with the release layer is a hard coat layer. A second underlayer 42, in contact with the hard coat layer is a primer layer.

Generally the primer layer 42 is in contact with the substrate 1. However in some case there may be further underlayers between the substrate and the primer or even between the primer and the hard coat, or the hard coat and the release layer.

Further, the primer layer may be absent from the optical device even if there is a hard coat layer.

Other alternative underlayers that may be present additionally or in place of the two underlayers cited above may be found in the following, non-extensive, list: a tinted layer, a photochromic layer, a multilayered hard-coat, a polarised film, one or more adhesive layers, such as made of hot melt adhesive or pressure sensitive adhesive, an antistatic layer, an antireflective coating.

In the first embodiment, the release layer is a layer that is adapted to receive and absorb a liquid at its interface with a pseudo-antireflective coating making the second coating. In a particular example, the release layer is a layer of hydrophilic material, for example one of the one cited in application EP10808928. For example it can be one 2-[methoxy (polyéthyleneoxy)propyl] trimethoxysilane of formula $CH_3O-(CH_2CH_2O)_y(CH_2)_3Si(OCH_3)_3$ with y being comprised between 6 and 9 included. Such component is distributed by the Gelest Inc. company under the reference number SIM6492.7. Such hydrophilic material is called SiPeO hereafter. Accordingly, the absorbed liquid used for activation is water. The SiPeO layer may have a thickness comprised between 1 nm and 20 nm, preferably between 2 nm and 5 nm.

Thus the optical device of the first embodiment comprises a primer 42 and hard coat 41, then on top of the hard coat, a layer of SiPeO, and on the SiPeO, the pseudo-antireflective coating, such as a single layer of $SiO_2$. The $SiO_2$ layer has preferably a thickness comprised in the range 20 nm to 100 nm.

Figure 3A:
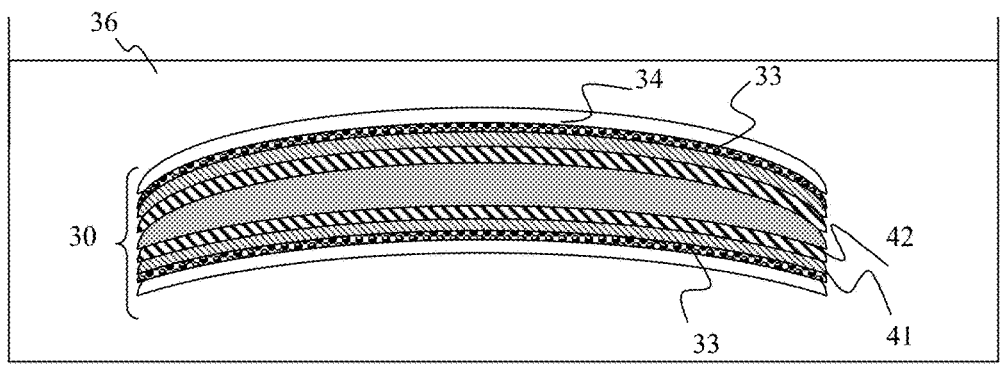
FIGS. 3a to 3d describe an activation of the first embodiment of the invention.
Figure 3B:
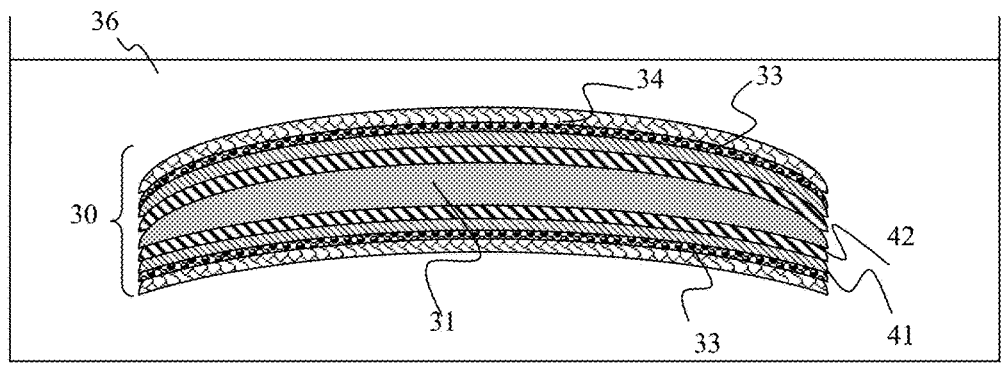
Figure 3C:
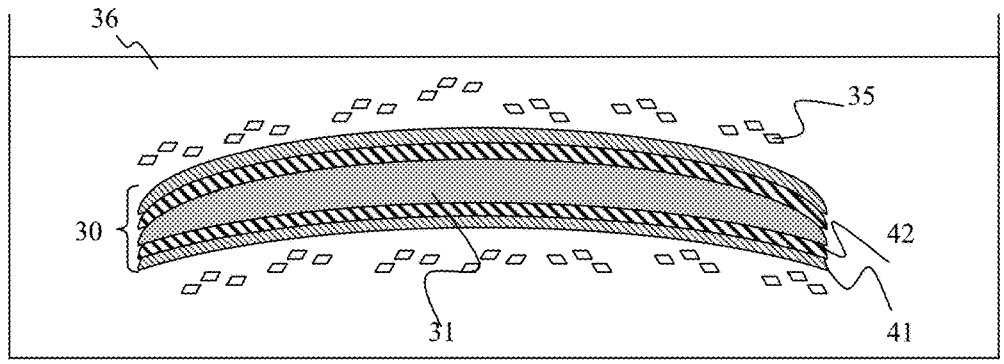

In that case, as seen in FIGS. 3a to 3d when the first optical device 30, FIG. 3a, is immerged in a water bath 36 the release layer 33 is activated. Indeed, water, driven by the hydrophilic properties of the SiPeO layer, accumulates at the interface between the release layer 33 made of SiPeO and a second coating 34 made of $SiO_2$, as illustrated by the dark bubbles in the FIG. 3a. Accordingly, the second coating 34 made of $SiO_2$ cracks under the pressure, FIG. 3b, and is dissociated in smaller $SiO_2$ flakes 35 that can be easily cleaned by soft wiping or that may even be displaced into the water bath, FIG. 3c.

Figure 3D:
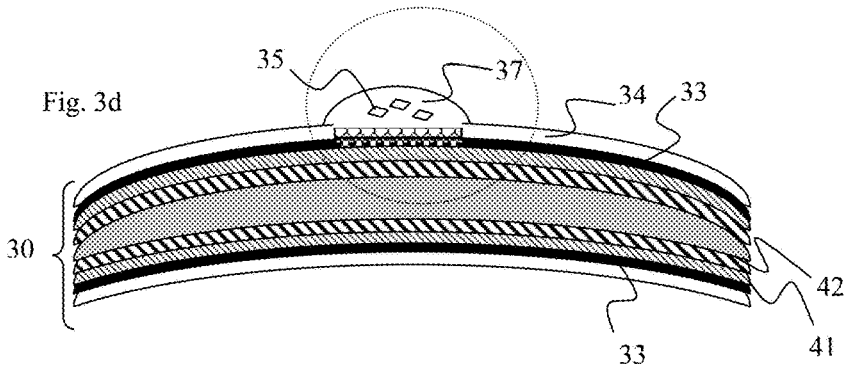

Thereafter, the optical device 30 is free of the second coating 34, FIG. 3d, with, for the first embodiment, only the two underlayer 41 and 42 remaining attached to the substrate 31.

The inventor postulates that the water reaches the SiPeO layer either through the antireflective layer or by the edges of the optical device, where the SiPeO layer 33 is apparent.

Alternatively, water 37 is just deposited locally, or sprayed, on the optical device, FIG. 3d, and with the water serving to bloat locally the interface between the second coating 34 and the release layer 33 and break the second coating 34 free from the hard coat 41. The water is also serving as lubricant for cleaning the flakes 35 of SiO₂ off of the substrate.

In a first variant of the first embodiment, the second coating 34 of SiO₂ may be replaced by a zirconia layer of thickness comprised in the range 20 nm-100 nm, overlayed with at least a SiO₂ layer of thickness in the range 20 nm-100 nm.

In some variants, the thickness of the SiPeO layer or of the second coating may be varied, in order to improve or decrease initial adhesion of the second coating on the release layer.

Figure 4A:
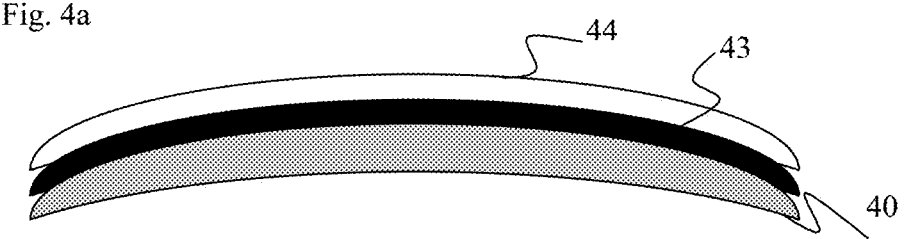
FIGS. 4a to 4c describe an activation of a second embodiment of the invention.
Figure 4B:
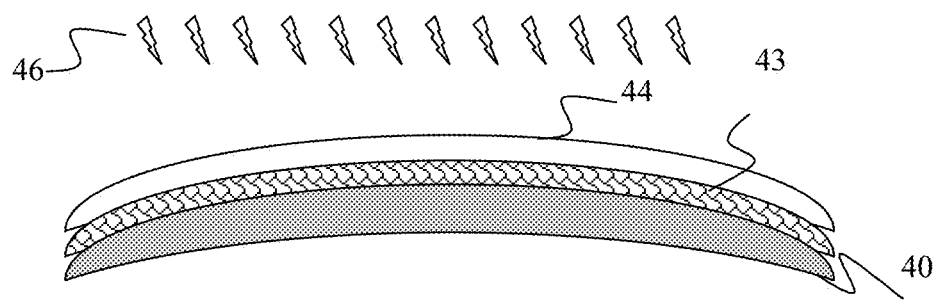
Figure 4C:
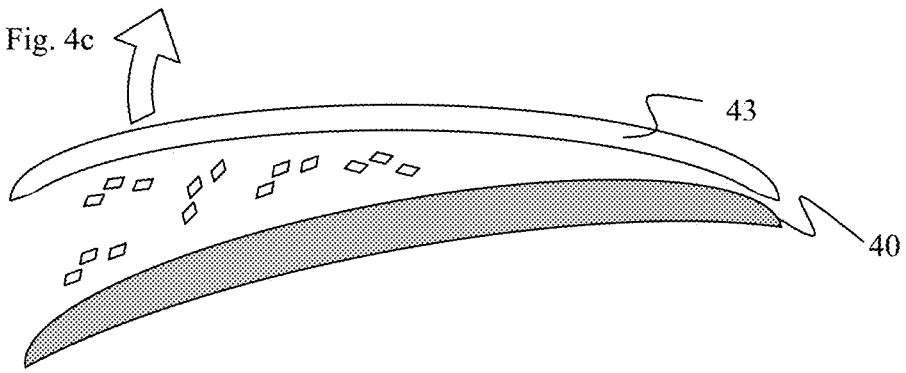

In a second embodiment, illustrated in FIGS. 4a to 4c, the second coating 44 is a hard coat, and the release layer 43 is an adhesive layer (FIG. 4a) that breaks down under UV activation 46 (FIG. 4b). Here, both the release layer 43 and the second coating 44 are present only on one face of the substrate 40.

The breaking down of the release layer 43 enables to remove the hard coat 44 from the substrate 40 (FIG. 4c), followed by removing the broken-down release layer 43 by wiping.

Figure 5A:
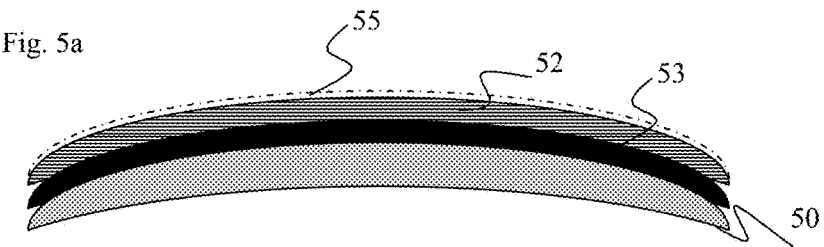
FIGS. 5a to 5c describe an activation of a third embodiment of the invention.
Figure 5B:
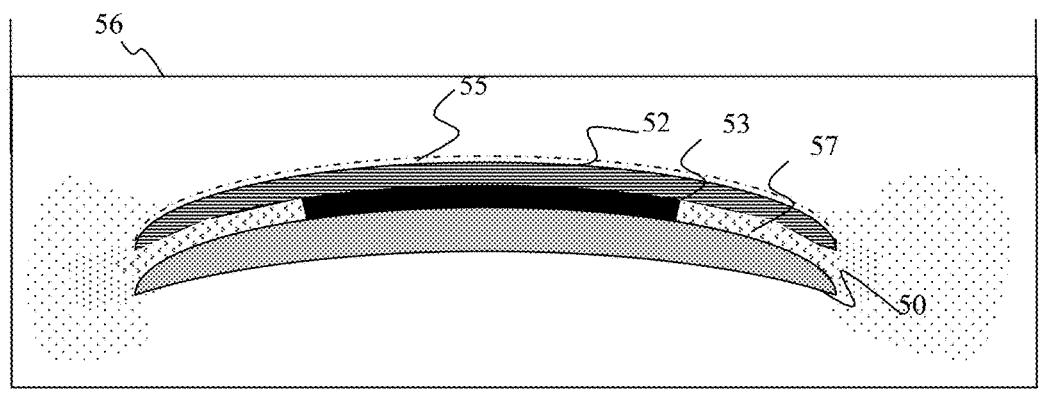
Figure 5C:
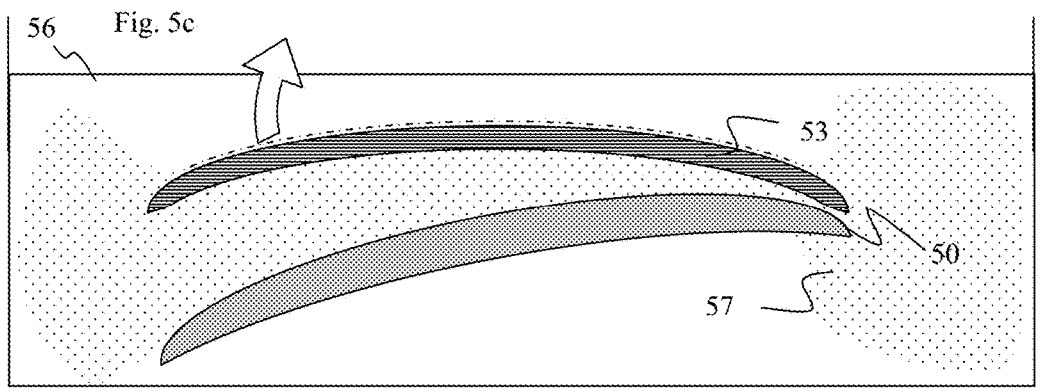

In a third embodiment, as illustrated in FIG. 5a, the substrate 50 is covered on one face by the second coating 52 which is an antireflective coating comprising multiple layers itself covered by a topcoat 55. The release layer 53 is an adhesive layer, such as a DOW corning 7651 or 7652 adhesive, distributed by DOW CORNING®. The release layer may be activated by soaking the lens in a toluene or xylene bath 56, for duration between 1 minute and 2 hours, which will dissolve the release layer 53, as shown in FIG. 5b, the dissolved release layer being represented by a tainted fluid 57. Such dissolution enables to remove the second layer 52, either in one piece or by breaking it easily in smaller pieces.

In different non-illustrated variants, the different layers of any embodiment, over or under the release layer, may be used in any of the other embodiments. Further types of release layers and activations methods will appear to the person skilled in the art.

Example of Realization, Based on the First Embodiment

10 CR39 lenses distributed by Essilor International® and comprising a standard primer-hardcoat double coating on both faces are used.

Using a 1200-DLF vacuum deposition machine, distributed by Satisloh®, 2 to 5 nm of SiPeO were deposited on the concave side of the lenses followed by an antireflective coating so as to form a release layer. The antireflective coating is composed of a multilayer stack comprising, as counted from the release layer of SiPeO, a first layer of zirconia, of about 20 nm, a first layer of silica, of about 20 nm, then a second layer of zirconia, of about 80 nm, and a second layer of silica of about 80 nm. The precise thickness of each of these four layers has been calculated by the man skilled in the art using standard calculating tools for defining antireflective stacks.

Using the same machine, on the convex side of the lenses an identical antireflective coating is deposited directly on the underlayers present on the lens, in particular directly on the hard coat, without deposition of the SiPeO layer.

The lenses were stored at room temperature during 24 hours.

Thereafter the antireflective coating is tested and presents good adhesion on both sides for all lenses. The lenses can be handled without damaging the added value which is presently the antireflective coating.

When the lenses are immersed in a bath of water, the antireflective coating present on the concave side delaminates in few seconds and disappears into the water bath. The antireflective coating present on the convex side is not affected by the immersion in the water bath and it stays on the lens.

The invention provides economical ways of manufacturing temporary layers on lenses, by allowing separating them from the lenses using a release layer activated with a specific trigger.

Accordingly, a salesperson or an eye-care professional (ECP) can easily provide an added value on a lens for a trial period. Further, the ECP can also provide for curious clients or clients in need a specific added value dedicated for a specific need which can be removed later once the client decides to change the added value, for example when the need has changed.

The invention claimed is:

1. An ophthalmic lens comprising an optical substrate with two main faces, a first coating in direct contact with at least one face of the optical device, and a second coating in contact with the first coating, wherein the first coating is a release layer that can be selectively activated to diminish mechanical properties or adhesion enabling the second coating to be fastened to the substrate, such that the second coating can be removed by activation of the first coating.

2. The optical device according to claim 1, wherein the optical device is an ophthalmic lens.

3. The optical device according to claim 1, wherein the second coating is an interferential optical filter coating.

4. The optical device according to claim 3, wherein the second coating comprises at least a nanometer-scale SiO2 layer or a nanometer scale ZrO2 layer.

5. A process of releasing a second coating on an optical device, the process comprising:
 a) Providing the optical device of claim 1; and
 b) Activating the release layer.

6. The process of claim 5, further comprising cleaning the optical device.

7. The process according to claim 5, wherein the release layer is a hydrophilic material adapted to incorporate aqueous liquids at the interface between the release layer with the substrate and/or the second coating, and wherein activating a release layer comprises immersing the optical device into a water bath or wiping the optical device using water.

8. The optical device according to claim 1, wherein the release layer is a material that is adapted to absorb external compounds, thereby forcing release of the second coating.

9. The optical device according to claim 8, wherein the release layer is a hydrophilic material adapted to incorporate aqueous liquids at the interface between the release layer with the substrate and/or the second coating.

10. The optical device according to claim 9, wherein the release layer is a 2-[methoxy(polyethylene-oxy)propyl] trimethoxysilane of formula $CH_3O-(CH_2CH_2O)_y(CH_2)_3Si-(OCH_3)_3$ with y comprised between 6 and 9 included.

11. The optical device according to claim 1, wherein the release layer is a material that degrades upon activation.

12. The optical device according to claim 11, wherein the material of the release layer has a degradation activated by a chemical, by irradiation, or temperature under 80° C.

13. The optical device according to claim 12, wherein the release layer is a glue or resin.

14. The optical device according to claim 13, wherein the release layer is a glue that is dissolved using a solvent.

15. A process for manufacturing an ophthalmic lens comprising the steps of providing an optical substrate with two main faces, providing a second coating onto at least one face of the substrate, and providing a release layer in-between the substrate and the second coating, thus forming the optical device, wherein the release layer is a layer that can be selectively activated to diminish mechanical properties or adhesion such that the second coating can be removed by activation of the first coating.

16. The process according to claim 15, wherein the release layer is a SiPeO layer deposited during a spraying step or a vacuum deposition step.

17. The process according to claim 15, wherein the second coating is an interferential optical filter coating, such as an antireflective stack, deposited during a vacuum deposition step.

18. The process according to claim 17, wherein the second coating is an antireflective stack.

\* \* \* \* \*